(12) United States Patent
Wiechers et al.

(10) Patent No.: US 8,666,905 B2
(45) Date of Patent: Mar. 4, 2014

(54) ANONYMOUS ONLINE PAYMENT SYSTEMS AND METHODS

(75) Inventors: Xavier Wiechers, Delta (CA); Yilei Wang, Redmond, WA (US)

(73) Assignees: Robert Bourne, Orlando, FL (US); Bryan Taylor, West Perth (AU)

( * ) Notice: Subject to any disclaimer, the term of this patent is extended or adjusted under 35 U.S.C. 154(b) by 942 days.

(21) Appl. No.: 12/127,814

(22) Filed: May 27, 2008

(65) Prior Publication Data

US 2008/0319913 A1     Dec. 25, 2008

Related U.S. Application Data

(60) Provisional application No. 60/940,357, filed on May 25, 2007.

(51) Int. Cl.
*G06Q 20/00* (2012.01)

(52) U.S. Cl.
USPC ............. 705/74; 705/64; 705/76; 902/2

(58) Field of Classification Search
USPC .................................................. 705/74
See application file for complete search history.

(56) References Cited

U.S. PATENT DOCUMENTS

| | | | | |
|---|---|---|---|---|
| 4,906,826 A * | 3/1990 | Spencer | ................ | 235/379 |
| 5,578,808 A * | 11/1996 | Taylor | ................ | 235/380 |
| 5,590,038 A * | 12/1996 | Pitroda | ................ | 705/41 |
| 5,671,279 A * | 9/1997 | Elgamal | ................ | 705/79 |
| 5,724,424 A * | 3/1998 | Gifford | ................ | 705/79 |
| 5,883,810 A | 3/1999 | Franklin et al. | | |
| 5,892,900 A * | 4/1999 | Ginter et al. | ................ | 726/26 |
| 6,000,832 A | 12/1999 | Franklin et al. | | |
| 6,016,476 A * | 1/2000 | Maes et al. | ................ | 705/18 |
| 6,108,644 A * | 8/2000 | Goldschlag et al. | ................ | 705/69 |
| 6,327,578 B1 * | 12/2001 | Linehan | ................ | 705/65 |
| 6,434,238 B1 * | 8/2002 | Chaum et al. | ................ | 380/45 |
| 6,685,088 B1 * | 2/2004 | Royer et al. | ................ | 235/380 |
| 6,731,731 B1 * | 5/2004 | Ueshima | ................ | 379/196 |
| 6,792,536 B1 * | 9/2004 | Teppler | ................ | 713/178 |

(Continued)

FOREIGN PATENT DOCUMENTS

| | | |
|---|---|---|
| EP | 1028401 A2 | 8/2000 |
| EP | 1033854 A2 | 9/2000 |
| WO | 00/02150 A1 | 1/2000 |

OTHER PUBLICATIONS

Danielle L. Babb, Factors Influencing Use of Virtual Private Networks Over Traditional Wide Area Networks by Decision-Making Technology Managers, A Dissertation Presented in Partial Fulfillment of the Requirements for the Degree Doctor of Philosophy, Mar. 2004, Capella University, USA.

*Primary Examiner* — Jacob C. Coppola
(74) *Attorney, Agent, or Firm* — DWC Law Firm, P.S.; David Chen

(57) ABSTRACT

In various embodiments, a central server grants access to a plurality of anonymous one-time-usable, time-sensitive encrypted tokens that identify consumer purchase orders. A plurality of certified merchant servers are certified by being provided with an application to securely connect the certified merchant servers to the central server for, among other things, transmitting purchase order data to the central server for use in generating the tokens. A plurality of financial institution servers can also be certified by being configured for use with an application that enables secure connection to the central server for, among other things, requesting the tokens.

4 Claims, 5 Drawing Sheets

(56) References Cited

U.S. PATENT DOCUMENTS

| | | | |
|---|---|---|---|
| 6,799,155 B1* | 9/2004 | Lindemann et al. | 703/24 |
| 7,003,789 B1* | 2/2006 | Linehan | 725/1 |
| 7,133,920 B2* | 11/2006 | Tsujisawa | 709/229 |
| 7,152,045 B2* | 12/2006 | Hoffman | 705/43 |
| 7,171,694 B1* | 1/2007 | Jespersen et al. | 726/27 |
| 7,366,703 B2* | 4/2008 | Gray et al. | 705/78 |
| 7,624,267 B2* | 11/2009 | Huang et al. | 713/168 |
| 7,702,538 B2* | 4/2010 | Rau et al. | 705/21 |
| 2001/0051902 A1* | 12/2001 | Messner | 705/26 |
| 2002/0026575 A1* | 2/2002 | Wheeler et al. | 713/156 |
| 2002/0029254 A1* | 3/2002 | Davis et al. | 709/217 |
| 2002/0032663 A1* | 3/2002 | Messner | 705/72 |
| 2002/0120563 A1* | 8/2002 | McWilliam et al. | 705/39 |
| 2002/0123972 A1* | 9/2002 | Hodgson et al. | 705/72 |
| 2002/0129088 A1* | 9/2002 | Zhou et al. | 709/200 |
| 2002/0138445 A1* | 9/2002 | Laage et al. | 705/67 |
| 2002/0147820 A1* | 10/2002 | Yokote | 709/229 |
| 2003/0005290 A1* | 1/2003 | Fishman et al. | 713/156 |
| 2003/0014363 A1* | 1/2003 | Sethi | 705/44 |
| 2003/0028481 A1* | 2/2003 | Flitcroft et al. | 705/39 |
| 2003/0061172 A1* | 3/2003 | Robinson | 705/67 |
| 2003/0069792 A1* | 4/2003 | Blumenthal | 705/16 |
| 2003/0149662 A1* | 8/2003 | Shore | 705/39 |
| 2003/0163423 A1* | 8/2003 | Holst-Roness | 705/40 |
| 2004/0030645 A1* | 2/2004 | Monaghan | 705/40 |
| 2004/0039693 A1* | 2/2004 | Nauman et al. | 705/39 |
| 2004/0044627 A1* | 3/2004 | Russell et al. | 705/50 |
| 2004/0249750 A1* | 12/2004 | Granzer | 705/40 |
| 2005/0027543 A1 | 2/2005 | Labrou et al. | |
| 2005/0278547 A1* | 12/2005 | Hyndman et al. | 713/185 |
| 2006/0020550 A1* | 1/2006 | Fields et al. | 705/51 |
| 2006/0090203 A1 | 4/2006 | Husain et al. | |
| 2006/0218396 A1* | 9/2006 | Laitinen et al. | 713/167 |
| 2006/0235761 A1* | 10/2006 | Johnson | 705/26 |
| 2006/0235795 A1* | 10/2006 | Johnson et al. | 705/44 |
| 2007/0245158 A1* | 10/2007 | Giobbi et al. | 713/186 |
| 2008/0046988 A1* | 2/2008 | Baharis et al. | 726/7 |
| 2008/0319913 A1* | 12/2008 | Wiechers et al. | 705/67 |

* cited by examiner

ANONYMOUS ONLINE PAYMENT SYSTEMS AND METHODS

CROSS-REFERENCE TO RELATED APPLICATION(S)

This application claims the benefit of U.S. provisional patent application Ser. No. 60/940,357, filed May 25, 2007, which is incorporated herein by reference in its entirety.

BACKGROUND OF THE INVENTION

1. Field of the Invention

The present invention relates generally to a payment system for use in executing secure online commercial transactions, and more particularly, to an online transaction system wherein consumer identity remains anonymous to merchants and a central system throughout an entire transaction.

2. Description of Related Art

Online payment systems have long been known and widely used. Many, if not all of them, are exposed to phishing attacks and fraud in general. While online payment systems will continue to be required and widely used, improvements on the behavior and payment flow are desirable to help ensure fraud-free online shopping where all parties are protected including the merchant, the financial institution and ultimately the consumer.

BRIEF SUMMARY OF THE INVENTION

In some embodiments of the present invention, computer implemented methods are provided for executing secure online transactions in an anonymous fashion. Systems for use in implementing the methods are also provided. In some embodiment, the methods can comprise a consumer shopping on a merchant website without providing any personally identifying information. When the consumer selects to make a purchase, purchase order data (without consumer identifying data) can be sent from the merchant server to a central server. In some embodiments, the merchant is required to be certified for communications with the central server, as can be accomplished by providing an application on the merchant server configured for enabling secure communication with the central server. In response to receipt of the purchase order data, the central server can issue a token to be stored on the consumer device from which the consumer initiated the associated purchase order. The token can be encrypted and contain information associated with the purchase order data, or purchase order information. The consumer device, such as a computer, can also be provided with an application containing code for instructing a processor of the computer to receive tokens from the central server for storage in a memory of the computer, and to respond to requests by other certified remote systems as discussed herein, to transmit the tokens.

The consumer can access a financial institution website online and request to see purchase orders previously submitted by the consumer to merchants. The financial institution may be required to be certified to communicate with the central server. In response to the consumer request, the financial institution server can contact the central server, which, in turn, can request tokens from the consumer device to retrieve the tokens. The central server can also decipher the retrieved tokens to read and transmit purchase order information displayable by a website of the financial institution to the consumer. The consumer can then authorize the purchase orders through the website of the financial institution, whereupon the financial institution server can transmit an authorization code to the central server. The central server then transmits the authorization to the merchant with which the underlying purchase order was placed. The merchant can then fulfill the order with the consumer and transmit a notification to the central server reporting the fulfillment. Thereafter, the financial institution server can be notified and payment can be distributed to the merchant. In alternative embodiments, payment can be made to the merchant upon authorization, even before an order is fulfilled, or the merchant can fulfill an order before payment is authorized.

No personally identifying information or financial credit or account access information of the consumer is transmitted to the merchant or central server. The merchant and central server can receive order identifying information and authorization messages from the financial institution.

In some embodiments, when the consumer is accessing a website of the financial institution to authorize payments for purchase orders, the consumer interacts only with the financial institution website without being re-directed to a merchant or central server. If the consumer is re-directed in some embodiments, the re-direct can be automated without user involvement to avoid phishing attacks.

DETAILED DESCRIPTION OF THE INVENTION

In the following description, certain specific details are set forth in order to provide a thorough understanding of various embodiments of the invention. However, upon reviewing this disclosure one skilled in the art will understand that the invention may be practiced without many of these details. In other instances, well-known or widely available hardware, software and network infrastructure and protocol have not been described in detail to avoid unnecessarily obscuring the descriptions of the embodiments of the invention.

Where section headings are provided below, they are provided only for clarity to the reader and are not intended to limit the content disclosed herein.

The term "access codes," as used herein, can include, without limitation, pin numbers or codes, in any character type, for use in accessing financial accounts, such as credit card authorization or online bank accounts, or any accounts containing data usable to access a financial account or personally identifying consumer information.

Figure 1:
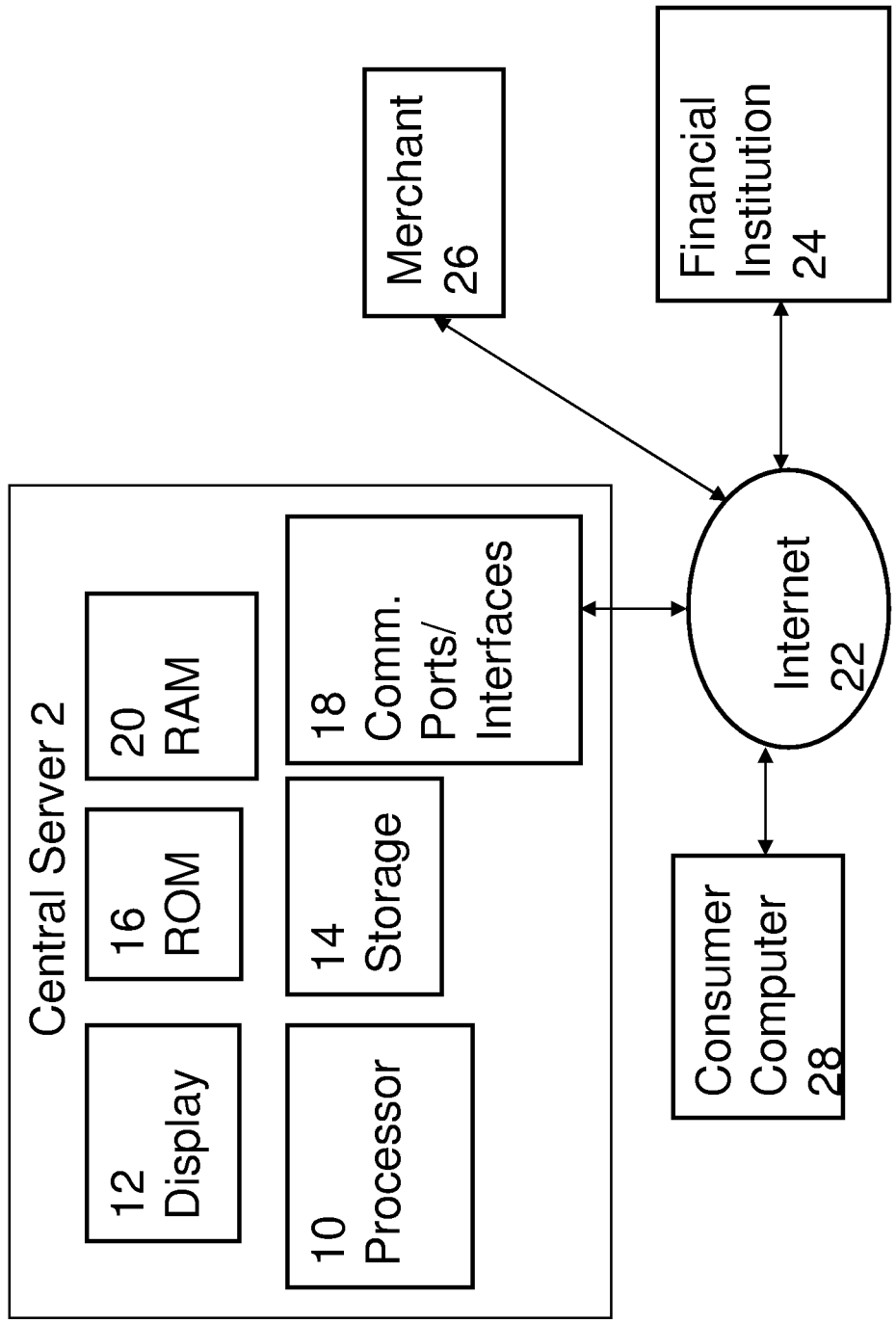
FIG. 1 is a block diagram of a system for use in implementing various embodiments of the present invention.

Referring to FIG. 1, various embodiments of the present invention can include a central server 2 which can be remotely accessible over a network 22 (e.g., the Internet) by a plurality of clients. The central server 2 can comprise one or more computers, or other devices or systems capable of processing instructions and information and communicating over the network 22.

FIG. 1 further shows a merchant server 26, financial institution server 24 and a consumer computer 28, each of which can be in independent communication with the central server 2.

Each of the central server 2, financial institution server 24, merchant server 26 and consumer computer 28 can include one or more processors 10, displays 12, non-volatile storage devices 14, ROM 16, a plurality of communications ports 18 and communications interfaces, and RAM 20. The plurality of communication ports 18 can receive control signals from input devices (e.g., keyboard or mouse) and various communications interfaces can be provided to enable communications over the network 22.

Each of the consumer computer 28, central server 2, financial institution server 24, and merchant server 26 can be provided with an application including a graphical user interface component, configured to permit secure communication with the central server 2, as will be appreciated by those skilled in art after reviewing this disclosure. In some embodiments of the present invention, merchants and financial institutions can be provided with software development kits (SDKs) which are certified by the central system 2. The SDKs permit the merchants to enable the consumers to place orders from a website of the merchant with the central system of the present invention and enable the merchants to, in turn, place consumer orders without requiring the consumer to input any linking data (credit card, access codes, pin numbers, full or partial personal data, etc.) to link the orders with the consumer placing the order. The SDKs provided to the financial institutions enable the consumer to retrieve the orders from the central system 2 via a website of the financial institution without the need to input any linking data (credit card, access codes, pin numbers, full or partial personal data, etc.). The consumer is then allowed to choose from any of various compatible accounts, from a certified financial institution, to authorize and make payments.

Figure 2:
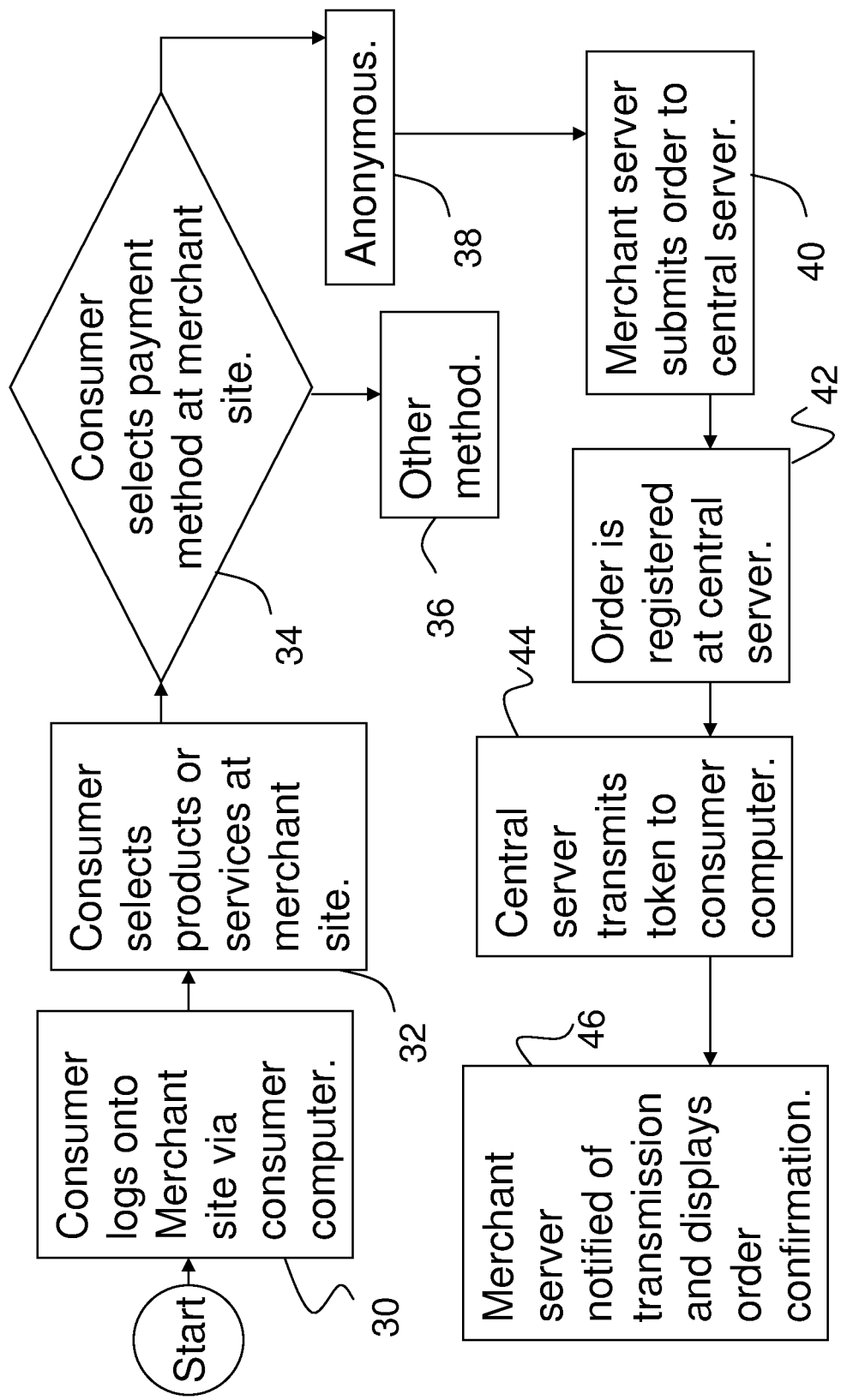
FIG. 2 is a flow diagram showing steps for placing an online order with a merchant in some embodiments of the present invention.

In particular, referring to FIG. 2, in some embodiments of the present invention, at step 30, a consumer accesses a website of a certified merchant hosted at merchant server 26. At step 32, the consumer places an order via the website of the certified merchant. The consumer can shop for products or services at the merchant's website, and can select a payment method at step 34. If the consumer selects an anonymous payment method of the present invention at step 38, the merchant server 26 transmits the consumer's purchase order data to the central server 2 at step 40 without transmitting any consumer identifying information or consumer access codes. This transmission can be made via an application hosted at the merchant server 26 which is capable of direct and secure communication with the central server 2. An application at the central server 2 includes instructions for a processor of the central server 2 to register the order at step 42, which can include generating one or more tokens containing encrypted information for identifying the purchase order. At step 44, the token can then be transmitted to the consumer computer 28 by the central server 2 for storage on a memory of the consumer computer 28. The consumer computer 28 can be provided with an application containing instruction for receiving and storing the token. Once the token is transmitted to the consumer computer 28, the central system 2 transmits a notification to the merchant server 26, at step 46, which, in turn, can display an indication to the consumer through the merchant website via a display of the consumer computer 28, confirming that the consumer order is awaiting authorization for payment. As will be appreciated by those skilled in art after reviewing this disclosure, the consumer can place a plurality of orders through the merchant server.

Figure 3:
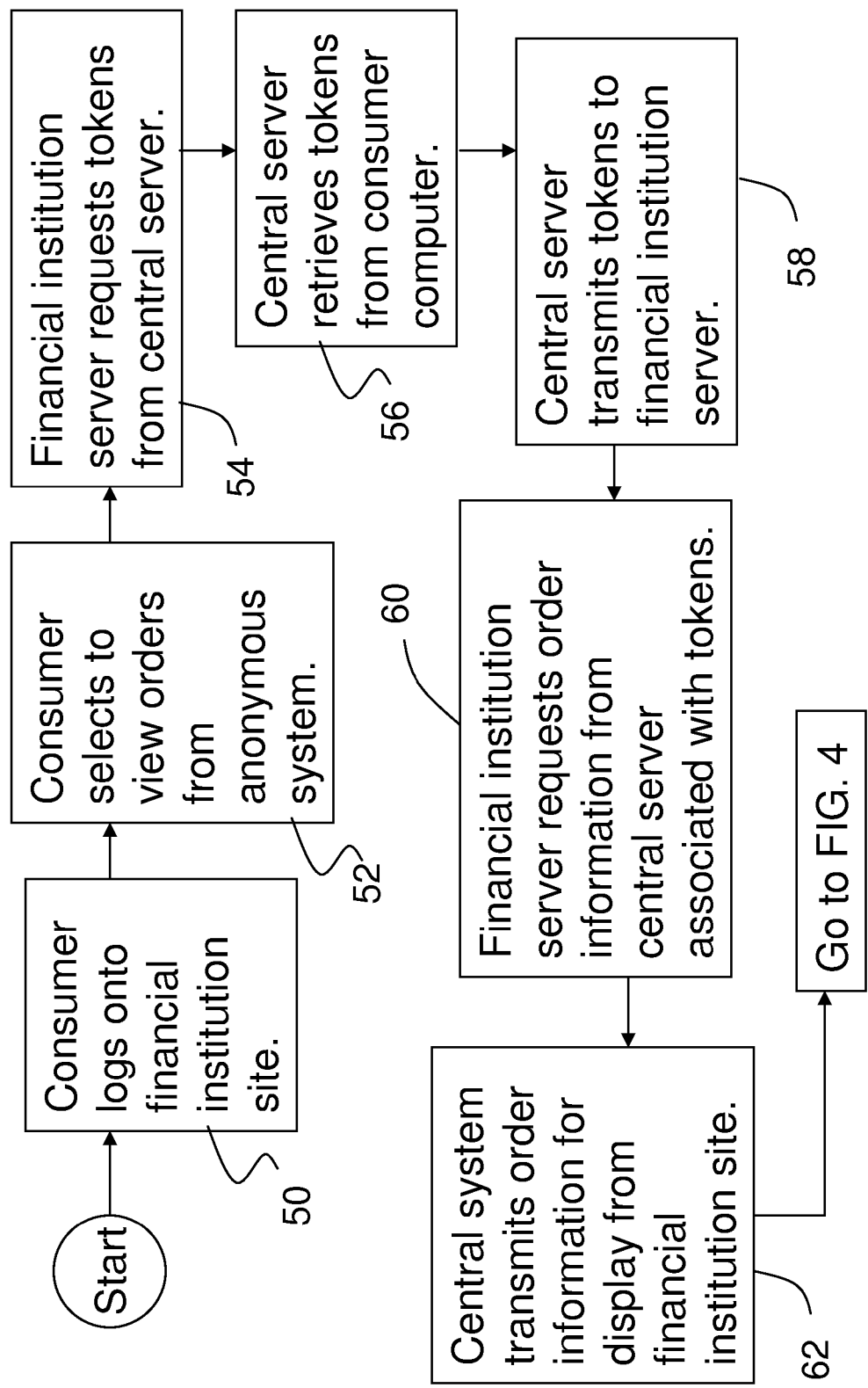
FIG. 3 is a flow diagram showing steps for order authorization for some embodiments of the present invention.

Turning now to FIG. 3, at step 50, when a consumer wishes to authorize an order for payment, the consumer can log onto a website of a trusted financial institution that is certified for interaction with the central system 2. That is, for example, the website of the financial institution is configured to interface with an application of the central system 2 for carrying out the following steps. At step 52, a consumer can use a graphical interface of the website of the financial institution to request to view orders. The financial institution server 24 can respond by, at step 54, requesting the central server 2 to retrieve tokens from the consumer computer 28. At step 56, the central server 2 retrieves tokens from the consumer computer 28. At step 58, the central server 2 transmits the tokens retrieved from the consumer computer to the financial institution server 24. In some embodiments, the retrieved tokens can be stored at the server of the financial institution in association with an account of the consumer for access later by the consumer. At step 60, the financial institution server 24 requests order information associated with the retrieved tokens from the central server 2. At step 62, the central server 2 interprets the encrypted order identifying information associated with the tokens and transmits order information to the financial institution server 24, which is displayed to the consumer via the website of the financial institution.

Figure 4:
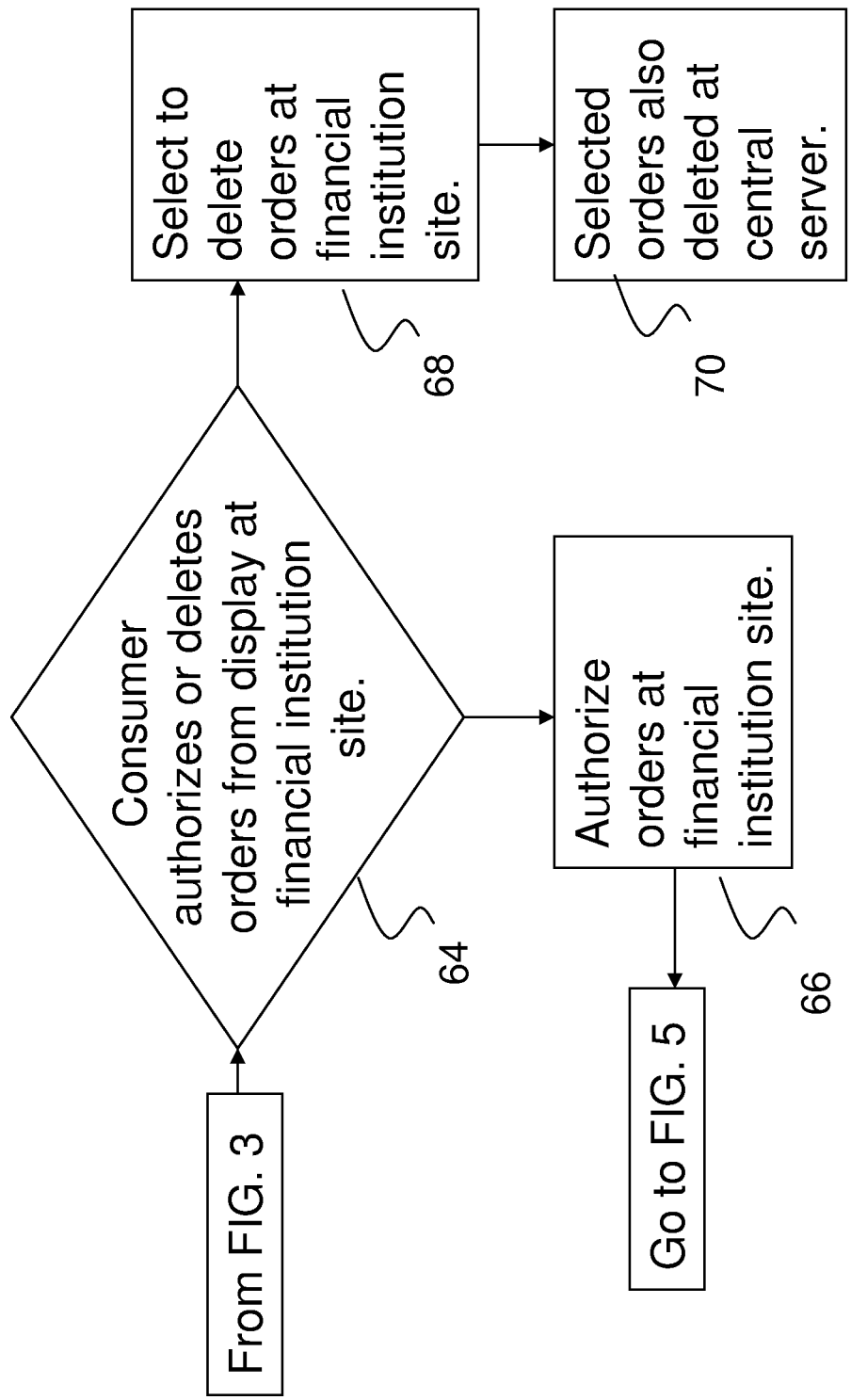
FIG. 4 is a flow diagram continued from FIG. 3 showing steps for order authorization for some embodiments of the present invention.
Figure 5:
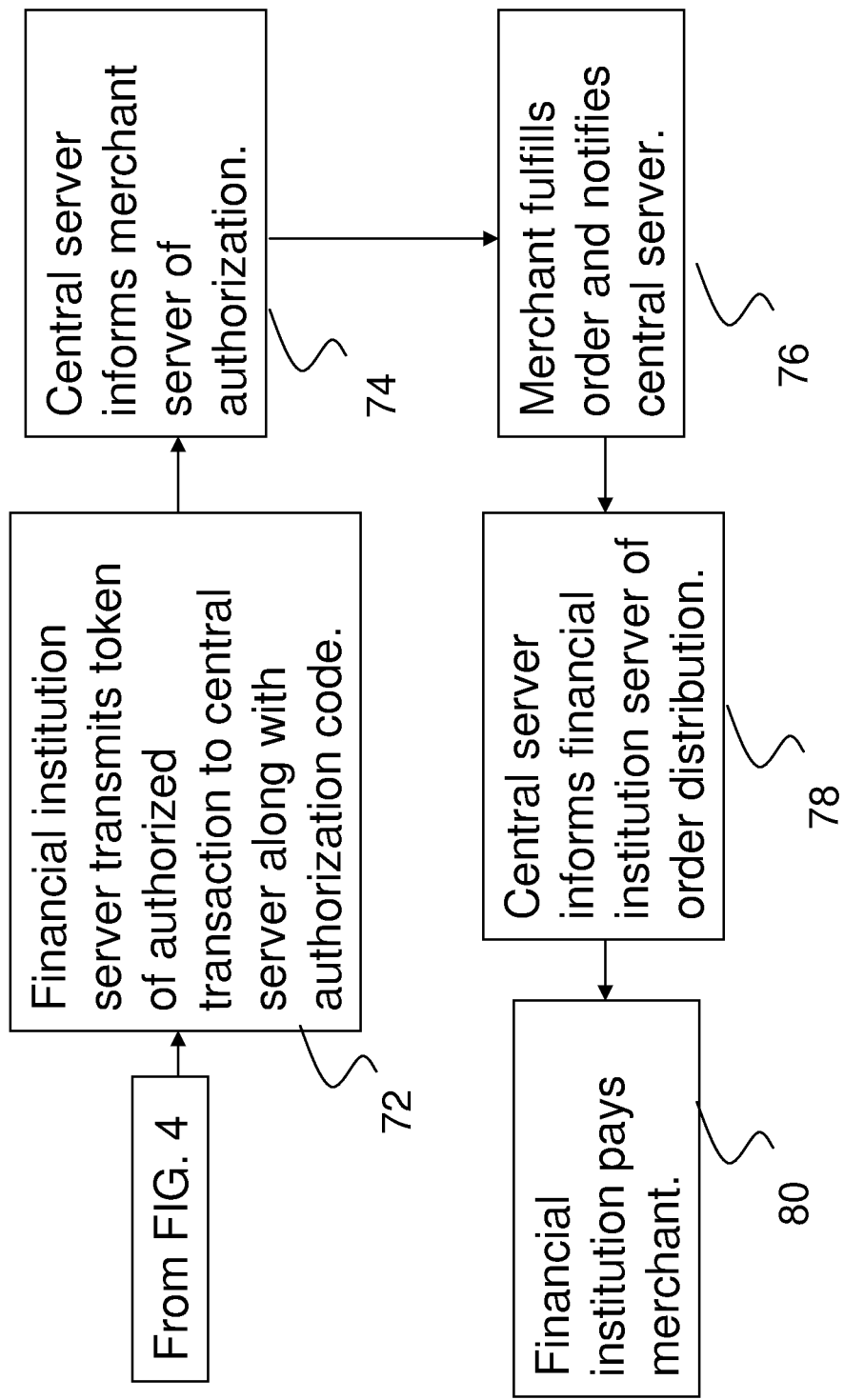
FIG. 5 is a flow diagram continued from FIG. 4 showing steps for order fulfillment and payment for some embodiments of the present invention.

As can be seen in FIG. 4, at step 64, the consumer can elect to authorize an order at step 66, or delete a displayed order at step 68. As shown in FIG. 5, at step 72, if the order is authorized, the financial institution server 24 transmits an authorization code to the central server 2 along with the token associated with an authorized order. At step 74, the central server 2 transmits the authorization to the merchant who, in turn, fulfills an associated consumer order at step 76 and informs the central server. At step 78, the central sever informs the financial institution that the order has been fulfilled. At step 80, the financial institution pays the merchant.

As noted above, in some embodiments of the present invention, the central system issues tokens to the consumer computer 28 which are encrypted and which identify the purchases made by the consumer at a merchants' online shopping site. In some embodiments, the tokens are decipherable and understood only by an application on the central server 2. The tokens may contain data about a purchase made by the consumer but do not include any personal or financial information of the consumer. The tokens can auto-expire if the consumer does not complete the transaction by authorizing the associated purchasers at a financial institution's website. In some embodiments, the tokens expire after one week (7 days). In other embodiments, the tokens expire after a longer period of time, or a shorter period of time.

In various embodiments of the invention as described above, it is unnecessary for the consumer to be involved in any online re-directing from a website of a merchant to a website of the central server or the financial institution and this can avoid phishing attacks. The present invention also does not require the consumer, or consumer computer 28, to provide any linking data (e.g., electronic signature, access code, credit card number, pin numbers, full or partial personal data, etc.) to link an order. Even after the order has been authorized or paid, the consumer is not known to the central server as the central server only receives an authorization code associated with a token to prove that the order has been authorized and authenticated by a financial institution. The consumer thus can enjoy full anonymity with the merchant and central sever.

Although specific embodiments and examples of the invention have been described for illustrative purposes, various equivalent modifications can be made without departing from the spirit and scope of the invention, as will be recognized by those skilled in the relevant art after reviewing the present disclosure. The various embodiments described can be combined to provide further embodiments. The described structures, systems and methods can omit some elements or acts, can add other elements or acts, or can combine the elements or execute the acts in a different order than that illustrated, to achieve various advantages of the invention. These and other changes can be made to the invention in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A computer implemented method executed by a central server in communication with a merchant, financial institution, and consumer, for executing a secure online transaction comprising:

receiving purchase order data for a purchase order from a merchant, the purchase order having been initiated by a consumer;

issuing a token to the consumer in response to receiving the purchase order data, the token being associated with the purchase order data and not containing any personally identifying information regarding the consumer;

receiving a request for the token from a financial institution as a result of a request to view orders, wherein the request to view orders is provided by the consumer while using a system of the financial institution;

retrieving the token from the consumer in response to the request from the financial institution and transmitting the token to the financial institution;

transmitting at least part of the purchase order data associated with the token for display to the consumer;

receiving an authorization to pay for the purchase order from the financial institution as a result of the consumer transmitting an authorization to the financial institution;

transmitting the authorization to the merchant;

receiving notification from the merchant regarding execution of a transaction based on the purchase order; and informing the financial institution of the execution of the transaction based on the purchase order whereby the financial institution can pay the merchant.

2. The method of claim 1 wherein no consumer identifying information or access code information is transmitted to or from the merchant throughout the recited steps of claim 1.

3. The method of claim 1 wherein a processor of a central server carries out the recited steps of claim 1 and wherein no consumer identifying information or access code information is transmitted to or from the central server throughout the recited steps of claim 1.

4. The method of claim 1 wherein the token expires in a pre-determined time period if an associated purchase order is not authorized.

* * * * *